(12) United States Patent
McGettigan et al.

(10) Patent No.: US 7,088,510 B2
(45) Date of Patent: Aug. 8, 2006

(54) ANTI-ALIASING OPTICAL FILTER FOR IMAGE SENSORS

(75) Inventors: Anthony D. McGettigan, Santa Rosa, CA (US); Georg Ockenfuss, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 76 days.

(21) Appl. No.: 10/785,589

(22) Filed: Feb. 23, 2004

(65) Prior Publication Data

US 2005/0185268 A1 Aug. 25, 2005

(51) Int. Cl.
*G02B 27/28* (2006.01)
*G02B 5/30* (2006.01)

(52) U.S. Cl. ............... 359/495; 359/359; 359/494

(58) Field of Classification Search ............ 359/359, 359/484–500
See application file for complete search history.

(56) References Cited

U.S. PATENT DOCUMENTS

2002/0180916 A1  12/2002  Schadt et al. ............ 349/117
2004/0009311 A1  1/2004  Shukla et al. ............ 428/1.3

FOREIGN PATENT DOCUMENTS

WO    WO 98/52077 A    11/1998

OTHER PUBLICATIONS

Greivenkamp, John E., Color Dependent Optical Prefilter for the Suppression of Aliasing Artifacts, Applied Optics, vol. 29, No. 5, 676-84 (Feb. 10, 1990).
Seiberle et al., Photo-Aligned Anisotropic Optical Thin Films, SID 03 DIGEST, 1162-65 (2003).
Eastman Kodak Company, Low-Cost, Plastic Blur Filter, Kodak Optical Products, 1-3 (May 1999).
Nikon, Image Processing Algorithms [online], Image Processing Technology [Nov. 12, 2003] Retrieved from: http://www.nikon.com.jp/main/eng/portfolio/technology_e/image_processing_e/.
Sunex, Inc., Optical low-pass filter [online], Optics-Online.com, [Nov. 12, 2003] Retrieved from: http://www.optics-online.com/lpf.asp.
Canon, Infrared-Cut Low-Pass Filter [online], [Nov. 12, 2003] Retrieved from: http://www.canon.com/technology/detail/digi_35mm/lo_filter/.
Kinseki, Ltd., Crystal Optical Low Pass Filter, Product Catalog, Optical Device, 109 (2003).
Nihon Dempa Kogyo, Optical Components [online], Double Refraction Plates, 18-20 [Nov. 12, 2003] Retrieved from: http://www.technokey.com/ndk/pdf/kg/eop0018.pdf.
Daishinku Corp., Optical Low Pass Filters [online], Products Catalog, Optical Quartz Products [Nov. 12, 2003] Retrieved from: http://www.kdsj.co.jp/english.html.
Schadt et al., "Photo-Generation of Linearly Polymerized Liquid Crystal Aligning Layers Comprising Novel, Integrated Optically Patterned Retarders and Color Filters", Japanese Journal of Applied Physics, Tokyo, JP, vol. 34, No. 6A, Jun. 1, 1995, pp. 3240-3249.

*Primary Examiner*—Drew A. Dunn
*Assistant Examiner*—Joshua L Pritchett
(74) *Attorney, Agent, or Firm*—Allen, Dyer, Doppelt, Milbrath & Gilchrist, P.A.

(57) ABSTRACT

An anti-aliasing filter includes a polymeric double-refraction plate ("DRP"). The DRP of the anti-aliasing filter has at least a first liquid photo-polymerization ("LPP") layer disposed on the substrate, or on an intervening layer(s) disposed on the substrate, and a first liquid-crystal polymer ("LCP") layer is disposed on the first LPP layer, the first DRP having a thickness selected so as to provide a selected separation of oridinary and extraordinary light rays.

20 Claims, 2 Drawing Sheets

ANTI-ALIASING OPTICAL FILTER FOR IMAGE SENSORS

CROSS-REFERENCE TO RELATED APPLICATIONS

This patent application is being concurrently filed with U.S. patent application Ser. No. 10/785,384, entitled METAL-DIELECTRIC COATING FOR IMAGE SENSOR LIDS, by Georg Ockenfuss and Steven D. Oliver, the disclosure of which is hereby incorporated in its entirety for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to optical filters, and more particularly to low pass optical filters commonly known as anti-aliasing filters.

BACKGROUND OF THE INVENTION

Imaging devices, such as digital still cameras, camera phones ("camphones"), video recorders, digital scanners, and digital copiers, use photodetector arrays to produce electronic signals that are capable of producing images output to a display or printer. A typical photodetector array has many individual photosites or picture elements ("pixels"), each of which is responsive over a relatively wide range of wavelengths. The magnitude of the electrical signal produced by a single photodetector at different wavelengths of light varies according to the wavelength response of the photodetector. To form a color image, color pass filters are typically placed over individual photodetectors so that each photodetector is responsive to a relatively narrow wavelength range of light.

The photosites in a photodetector array are often called "pixels" because each photodetector generates an electronic signal typically used to produce a picture cell in an image. The pixels in a photodetector array are typically spaced in a repeating fashion, and pixel spacing is often referred to in terms of pitch, which is the center-to-center spacing between pixels in a photodetector array. In color photodetector arrays, the pitch is often different for pixels responsive to the different colors.

The image captured by the image sensor is sampled by the photodetector array, that is, a continuous image is reconstructed from the data detected by the individual pixels. The more closely spaced the pixels are, the higher the sampling frequency, and the more data there is to reconstruct the image from. It is generally desirable that the reconstructed image is a faithful reproduction of the original image. However, an image that contains input (such as closely spaced lines) at a higher frequency than twice the sampling frequency may cause the resultant image to not be a faithful reproduction of the original image.

As long as the sampling frequency is more than twice as high as the highest frequency in the signal (image), the sampled image will be a proper representation of the original image. If, however, the sampling frequency is less than twice as high as the highest frequency to be sampled, the sampled image will contain extraneous components called "aliases." The generation of aliases is called aliasing. Aliasing is avoided in digital imaging systems by providing a low pass filter to eliminate frequency components higher than one-half the sampling frequency (also known as the "Nyquist frequency") from reaching the photodetector array.

A more detailed discussion of aliasing, including figures illustrating aliasing effects is provided in the paper entitled "Color dependent optical prefilter for the suppression of aliasing artifacts," by John E. Greivenkamp, published in APPLIED OPTICS, Vol. 29, No. 5, 676–84 (Feb. 10, 1990).

FIG. 1A illustrates an aliasing effect. An original image 10 includes alternating dark 11, 13 and light 12, 18, 24 lines. The spacing of the lines is the "image frequency." A photodetector array 14 includes a plurality of photosites (pixels) 15, 16, 17 that are not as closely spaced as the closely spaced lines imaged onto the photodetector array. The first pixel 15 is mostly illuminated with a dark line 11, thus producing a dark output 20. The second pixel 16 is partially illuminated with a dark line 13 and partially illuminated with a white line 18, thus producing a medium (gray) output 22, and the third pixel 17 is mostly illuminated with a white line 24, thus producing a light output 26. Note that the output from the pixels produces a different pattern and lower frequency than the original image. Anti-aliasing filters (also known as "blur filters") are used to reduce the effects of aliasing, at the expense of reduced image sharpness.

Conventional blur filters are made of a birefringent crystal, such as quartz crystal or lithium niobate, cut at a particular crystalline orientation (typically 45 degrees with respect to the crystal lattice orientation) to a specific thickness. Such filters are known as double-refraction or "Savart" plates. A double-refraction plate ("DRP") separates an incoming ray of light into an "ordinary ray" and an "extraordinary ray" having different polarization states.

FIG. 1B shows a DRP 40 separating an incoming ray of light ("ray") 42 into an ordinary ray 44 and an extraordinary ray 46. The distance "d" between the ordinary ray 44 and extraordinary ray 46 depends on the thickness "t" of the DRP 40 and the difference between the ordinary and extraordinary indices of refraction of the DRP 40. Double ended arrows 37, 39 indicate that the ordinary ray 44 has a different polarization state 37 than the polarization state 39 of the extraordinary ray 46. A typical thickness for a quartz DRP to be used with a 5 mega-pixel photodetector array having a pixel pitch of 2.8 microns is about 0.3 mm.

In color imaging systems, a retarder plate (¼ wave plate) and a second DRP are sometimes used to provide two-dimensional blurring. A typical thickness for such an assembly is about 1.2 mm. Thus, using quartz DRPs results in a relatively thick, heavy assembly, which is generally undesirable and particularly undesirable for compact, portable imaging devices such as digital still cameras, video cameras, and camphones. Furthermore, quartz DRPs are relatively expensive components.

Therefore, it is desirable to provide aliasing filters that avoid the disadvantages of the prior art.

BRIEF SUMMARY OF THE INVENTION

A birefringent polymer coating having a high difference between the ordinary and extraordinary indices of refraction is used in thin, lightweight anti-aliasing filters for use in digital imaging systems. In one embodiment, anti-aliasing filters are made by disposing a liquid photo-polymerization layer on a substrate, such as a glass slide, a sheet of infrared-blocking ("IR-blocking") color glass, or low a-emitting glass, photo-aligning the liquid photo-polymerization layer to a desired orientation, and curing. One or more layers of liquid-crystal polymer is aligned to the photo-polymerized layer and cured to obtain a polymeric DRP. In a further embodiment, a second polymeric DRP is separated from the first DRP by one or more retarder plates. In some embodiments, the retarder plate is a quarter-wave plate that acts as a depolarizer. In other embodiments, the retarder plate is a full-wave plate at a wavelength (color), and is not a full-wave plate at other colors.

DETAILED DESCRIPTION OF EMBODIMENTS

1. Introduction

Figure 1A:
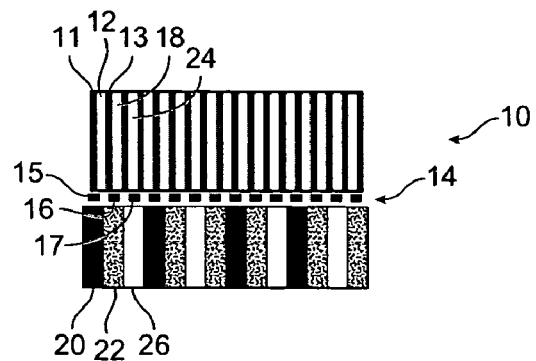
FIG. 1A is a simplified diagram illustrating aliasing.

The present invention uses liquid photo-polymerization ("LPP") material in combination with a birefringent polymer, such as a liquid-crystal polymer ("LCP") material, to form DRPs for use in one-dimensional and two-dimensional blur filters. These layers are referred to as LPP/LCP layers. In an embodiment of a two-dimensional blur filter, LPP/LCP layers are used as a first DRP, a retarder plate, and a second DRP. In some embodiments, a DRP includes multiple LPP/LCP layers. Suitable LPP and LCP materials are available from ROLIC TECHNOLOGIES, LTD., of Allschwil, Switzerland.

The optical axis of the LPP/LCP layer is selected by orienting the LPP portion of the LPP/LCP layer (the LPP layer is also known as the base layer or linear layer) with linearly polarized light. A base layer of LPP material is applied to a substrate, such as a glass, low alpha-emitting glass, or color-glass (e.g. infrared absorbing glass) slide, typically by spin-coating. The linearly polarized light orients the LPP according to the direction of polarization, and the base layer is developed (i.e. cured under the polarized light), fixing its orientation. An example of an LPP is polyvinyl 4-methoxy-cinnamate ("PVMC").

After the base layer is developed, a layer of birefringent polymer, such as LCP, is applied over the developed base layer at a thickness selected to achieve the desired optical effect. The LCP is heated to about 50–55° C., wherein the LCP aligns to the LPP layer, and the LCP material is cured to fix the alignment of the LCP to the cured LPP.

The thickness and orientation of an LPP/LCP are selected according to the desired optical effect. For example, in a DRP, the thickness and orientation are selected to provide a selected separation between the ordinary and extraordinary beams. In a retarder plate, the thickness and orientation are selected to provide a selected retardation (polarization rotation) at a selected wavelength or range of wavelengths. Furthermore, the type of LPP material is often selected according to the desired orientation. For example, one LPP material might be used for an orientation of the optical axis parallel to the surface (i.e. the optical axis is in the plane of the LPP/LCP layer), such as for a retarder plate, and another LPP material used for orientation at a selected angle from the optical axis, such as at a 45 degree angle relative to the surface (plane) of the LPP/LCP layer for a DRP.

In color imaging systems, the thickness of the retarder plate is optionally chosen to provide one amount of retardation to one color, and another amount of retardation to another color. For example, the retarder plate might act as a half- or full-wave retarder plate for green light, which the human eye primarily uses for acuity, and act as a quarter-wave retarder plate for red and/or blue light (which the human eye uses primarily for chroma). Thus, in a two-dimensional blur filter system, the green light would not be blurred as much as the red and/or blue light. Another reason to provide different amounts of blurring for different colors is that many color photodetector arrays have more (typically twice as many) green photodetectors as red or blue photodetectors, and hence aliasing of green light occurs at a higher image frequency.

Achromatic depolarization is obtained by providing a stack of quarter-wave retardarder plates oriented at different angles from a polarization orientation of the ordinary or extraordinary rays, which are orthogonal to each other exiting the DRP. For example, a first LPP/LCP quarter-wave plate is oriented at about 4.5 degrees from the direction of polarization of the ordinary beam exiting the DRP, a second LPP/LCP quarter-wave plate is oriented at about 15.3 degrees, and a third quarter-wave plate is oriented at about 34.0 degrees. Each LPP/LCP quarter-wave plate is relatively thin, typically about 0.8 microns to about 1.3 microns thick, so stacking several quarter-wave plates does not significantly add to the thickness or weight of the anti-aliasing filter assembly. Additional quarter-wave LPP/LCP retarder plates are optionally added to a quarter-wave retarder plate stack, or a quarter-wave retarder plate stack has only two LPP/LCP quarter-wave retarder plates.

In comparison, quarter-wave plates manufactured from single-crystal quartz are typically much thicker. While the quarter-wave thickness of quartz is typically about 10 microns to 20 microns, quartz plates that thin are very difficult to handle in a manufacturing environment. Quartz retarder plates are often about 250 microns thick, which includes several half- and/or full-wave thicknesses plus a quarter-wave thickness. The added thickness makes the quartz retarder plates easier to handle and less prone to breakage during manufacturing. Stacking such retarder plates adds significant thickness and cost.

Figure 1B:
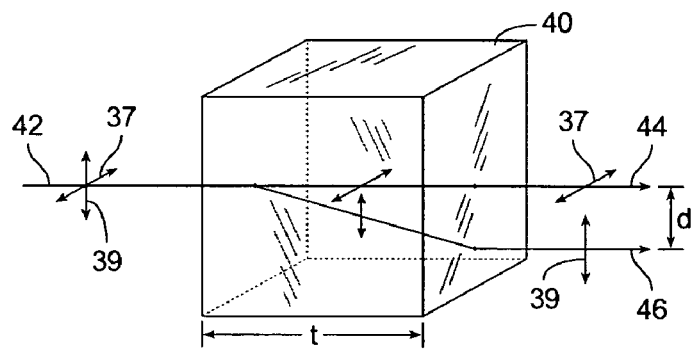
FIG. 1B is a simplified isometric view of a DRP.
Figure 2A:
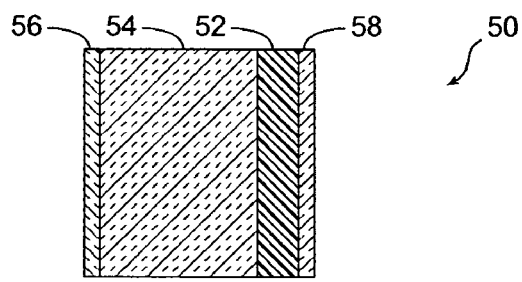
FIG. 2A is a simplified cross section of a one-dimensional blur filter assembly according to an embodiment of the present invention.

FIG. 2A is a simplified cross section of a one-dimensional blur filter assembly 50 according to an embodiment of the present invention. A DRP layer 52 of LPP/LCP has sufficient thickness to provide a desired separation of ordinary and extraordinary light rays (see FIG. 1B, ref. nums. 44, 46) is disposed on a substrate 54, such as a glass slide. Optional anti-reflective ("AR") coatings 56, 58 are formed on the surfaces of the one-dimensional blur filter assembly 50. In an alternative embodiment, the DRP layer 52 is connected to the substrate 54 with one or more intervening layers (not shown). The intervening layer(s) could be an index-matching layer or a layer to promote adhesion of the DRP to the substrate, or be part of an optical filter structure, such as an IR-blocking filter.

Using LPP/LCP coatings for a DRP, rather than crystalline quartz, allows for a much thinner DRP because the difference between the ordinary and extraordinary refractive indices ($\Delta n$) of the LCP material is about ten times greater than the $\Delta n$ for crystalline quartz. The $\Delta n$ for single-crystal quartz is about 0.01, while the $\Delta n$ for LCP is about 0.11. Thus, an LPP/LCP DRP achieves the same functionality (separation of ordinary and extraordinary light rays, i.e. blurring) with $\frac{1}{10}^{th}$ the thickness of crystalline quartz. For example, a quartz DRP having a thickness of about 0.3 mm is replaced with an LPP/LCP DRP having a thickness of about 0.03 mm. Also, this results in a lighter blur filter assembly because the DRP is thinner.

Many machining operations are typically required to make single-crystalline quartz DRPs. After growing suitable single crystals, which can take months, the crystals are sorted for optical quality, oriented and sawn on a precise axis to obtain blanks. Many quartz crystals show quartz lines, which are irregularities in the crystal structure, and appear as defects under high-intensity light, and are rejected for use as DRPs in many applications. The blanks are ground down to remove saw marks, planarize the blanks, and obtain a near-final thickness. Then, the blanks are polished to the final thickness and attain high-quality (scratch free) surfaces.

In comparison, the LPP is spun or otherwise coated onto a substrate and aligned by exposing it to linearly polarized light while it cures (dries). After developing the LPP, a layer of LCP is applied and heated to a moderate temperature to allow the LCP material to align to the LPP base layer, and cured. The thickness of the LCP material is limited in some applications by the application process, the precision of the resultant thickness that is required, and drying considerations. If a thicker layer is required, such as for a DRP, then multiple LCP layers are used to create the DRP. Each LCP layer is oriented and cured before applying the overlying LCP layer, the upper LCP layer aligning to the underlying LCP layer. For example, if LCP liquid is spun onto a cured LPP layer at a thickness of about 30 microns, applying and curing ten layers of LCP material would result in a DRP 0.03 mm thick. In an alternative embodiment, a second layer of LPP material is coated over cured LCP material, oriented, and cured, and another layer of LCP material is coated, aligned to the second layer of LPP material, and cured.

The desired thickness of the DRP depends on many factors, and generally ranges from about 10 microns to about 150 microns for use with photodetector arrays having a relatively small pixel pitch. For example, a camphone might have fairly small lenses and a small photodetector array having 2.5-micron pixel pitch. Such a device does not require as much separation between the ordinary and extraordinary rays as a device using a photodetector array having a greater pixel pitch, and a relatively thin (e.g. 30-micron) DRP may be used. In contrast, a high-end still camera might use a larger photodetector array with a greater pixel pitch (e.g. about 9 microns), and a thicker DRP (e.g. about 120 microns) might be desired to obtain greater separation between the ordinary and extraordinary rays.

The optional AR layers are thin-film dielectric stacks or, alternatively, single-layer AR coatings, such as a sol-gel coating. The processing temperature for forming and/or curing an AR coating over an LPP/LCP layer is generally kept below 200° C. In a particular embodiment, the AR coating 56 on the substrate 54 is a vacuum-deposited thin-film dielectric stack and the AR coating 58 on the DRP layer 52 is omitted or is a single-layer coating. While forming a thin-film dielectric stack on the DRP layer 52 is possible, the thermal expansion coefficient of a polymer material is often much greater than that of the thermal expansion coefficient of dielectric materials used in thin-film AR coatings, and the AR coating might craze (crack) if subjected to excessive temperature cycling. This potential problem is avoided by laminating a second glass substrate with an AR coating to the DRP layer 52 so that the AR coating is at the air interface (see FIG. 2C).

Figure 2B:
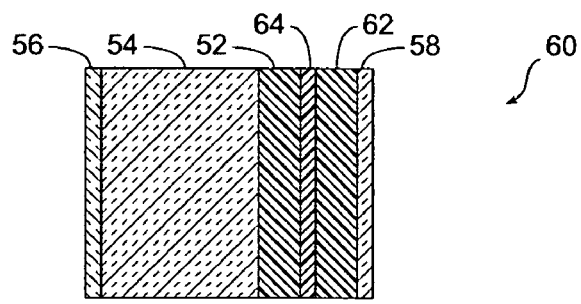
FIG. 2B is a simplified cross section of a two-dimensional blur filter assembly according to an embodiment of the present invention.

FIG. 2B is a simplified cross section of a two-dimensional blur filter assembly 60 according to an embodiment of the present invention. The blur filter assembly includes the substrate 54 and optional AR layers 56, 58. A second DRP layer 62 is separated from the first DRP layer 52 by an intervening retarder plate 64. The retarder plate 64 is also an LPP/LCP layer, but with a different orientation of the LPP/LCP and a different thickness. Generally, the orientation of the optical axis of the LPP/LCP layer in the retarder plate 64 is in plane (i.e. parallel to the surface of the LPP/LCP layer), and orientation of the optical axis of the LPP/LCP layer(s) forming the DRPs are tilted from the plane (surface) of the LPP/LCP layer, typically by forty-five degrees. Typically, the orientation of the optical axes of two DRPs are rotated relative to each other by ninety degrees.

The thickness and orientation of the optical axes of the DRPS are chosen according to the two-dimensional blur pattern desired. If the retarder plate is a quarter-wave plate, both the linearly polarized ordinary and extraordinary rays from the first DRP 52 will be converted to circularly polarized light, which the second DRP 62 will split into four rays, two ordinary rays, and two extraordinary rays. A quarter-wave retarder plate is also known as a "depolarizer." The pattern of the four rays exiting the second DRP 62 depends on the orientation of the LPP/LCP layers of both DRPs 52, 62 and the distance between the rays depends on the thicknesses of the DRPs. Selection of the proper orientations of the DRPS can produce four rays lying along a line, aligned with a row or column of a photodetector array, or at an angle across rows or columns, or in a "four-spot" pattern (as on gaming dice) or other pattern.

Furthermore, the thickness of the retarder plate can be chosen to generate different amounts of blurring for different colors. For example, a full-wave retarder plate does not change the polarization state of a light ray. Only two rays would exit the second DRP 62 for each light ray from a full-wave retarder plate. However, the thickness of the retarder plate is chosen in some embodiments to provide full-wave retardation of one color (e.g. green) and essentially quarter-wave retardation of another color(s) (e.g. red and/or blue). Thus more blurring occurs for one color (i.e. red and/or blue) than for another (i.e. green).

Figure 2C:
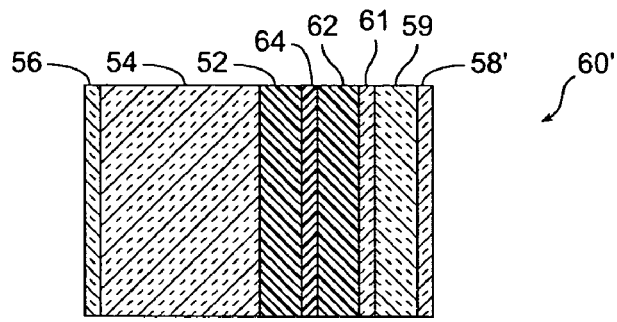
FIG. 2C is a simplified cross section of a two-dimensional blur filter assembly according to another embodiment of the present invention.

FIG. 2C is a simplified cross section of a two-dimensional blur filter assembly 60' according to another embodiment of the present invention. The AR layer 56, substrate 54, first DRP 52, retarder plate (depolarizer) 64, and second DRP 62 are described above in reference to FIG. 2B. The second AR layer 58' is deposited on another glass substrate 59 and attached to the LPP/LCP blur filter (i.e. the second DRP 62) with optical adhesive 61. In a particular embodiment, the optical adhesive 61 has an index of refraction between that of the LCP material and the substrate 59, thus providing improved index matching.

Figure 3:
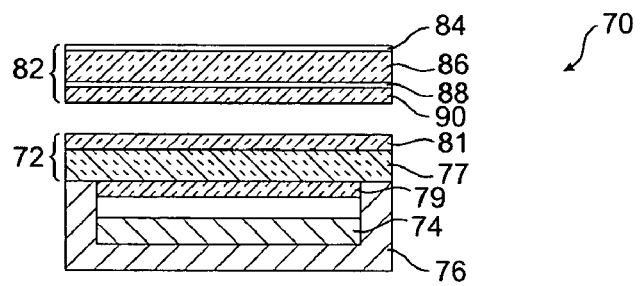
FIG. 3 is a simplified photodetector assembly according to an embodiment of the present invention.

FIG. 3 is a simplified photodetector assembly 70 according to an embodiment of the present invention. A lid 72 seals a photodetector array 74 inside a package 76. The photodetector array is a color photodetector array, or alternatively a black-and-white photodetector array. The lid 72 includes a glass substrate (cover glass) 77 with optional antireflective ("AR") coatings 79, 81 on both sides of the cover glass 77.

A filter 82 includes an optional IR-blocking filter 84 on a glass substrate 86. In an alternative embodiment, the IR-blocking filter, which may be a thin-film dielectric or thin film metal-dielectric IR-blocking filter, for example, is omitted. In an alternative embodiment, the glass substrate is made of IR-blocking glass, commonly known as "color glass," with or without additional IR-blocking means (e.g. thin-film filters). An optional AR coating is provided over the IR-blocking filter 84, which is particularly desirable if color glass is used.

An LPP/LCP blur filter 88 is formed on the opposite side of the glass substrate 86, and an AR coating 90 is formed over the blur filter 88, or alternatively, another glass substrate (not shown) with an AR coating is attached to the LPP/LCP blur filter 88. In a further embodiment, index-matching layers are included between the second glass substrate and the LPP/LCP blur filter. The LPP/LCP blur filter is a one-dimensional blur filter (one DRP) or alternatively a two-dimensional blur filter (two DRPs). In a further embodiment, the cover glass 77, which is closest to the photodetector array relative to the substrate 86, is made of a low α-particle emission glass, which is particularly desirable when using charge-coupled diode ("CCD") photodetectors.

Figure 4:
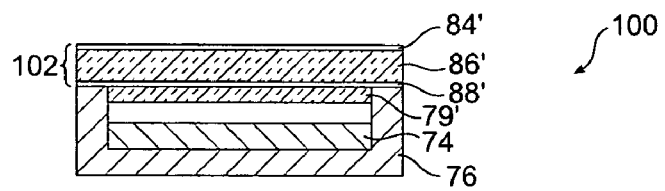
FIG. 4 is a simplified cross section of a photodetector assembly according to another embodiment of the present invention.

FIG. 4 is a simplified cross section of a photodetector assembly 100 according to another embodiment of the present invention. A lid 102 seals the photodetector array 74 in the package 76. The lid 102 includes an optional IR-blocking filter 84' on a glass substrate 86'. An LPP/LCP blur filter 88' and AR coating 79' are formed on the side of the glass substrate 86' opposite the IR-blocking filter 84'. This embodiment is desirable because of the short optical path provided by the photodetector assembly. Alternatively, the blur filter is on the top of the glass substrate 86' and the IR-blocking filter is on the bottom (i.e. on the side closest to the photodetector array 74)(not shown).

Various techniques have been developed for applying liquid polymer solutions, such as photo-resist, to substrates, such as by spin-coating, dipping, and spraying. Such techniques are well known in the art of photolithography. However, photolithographic applications often need only relatively thin layers of polymer solutions. While photolithography techniques, such as spin-coating, are suitable for applying the relatively thin layer(s) of LPP, thicker layers of LCP are often desirable for forming optical birefringent layers for use in anti-aliasing filters.

One approach to providing thicker LCP layers is to use a more viscous LCP solution and/or to spin coat at a lower speed. However, the precision of obtaining the desired thickness may degrade, making such LPP/LCP layers unsuitable in some embodiments. Another approach has been developed that applies multiple LCP layers, orienting each LCP layer to the underlying LPP or LCP layer, as the birefringent structure is built up.

Figure 5:
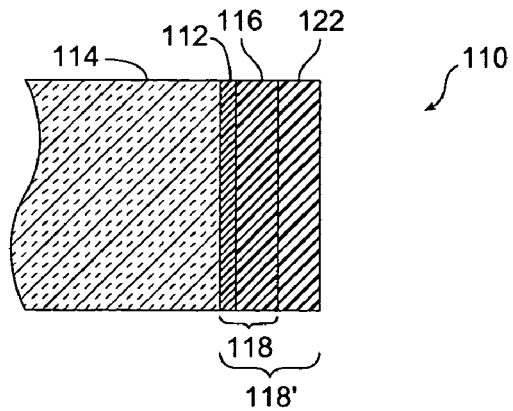
FIG. 5 is a simplified cross section of a layered DRP according to an embodiment of the invention.

FIG. 5 is a simplified cross section of a layered blur filter 110 according to an embodiment of the invention. A first LPP layer 112 is spun or otherwise deposited onto a substrate 114, such as a glass slide. The first LPP layer 112 is selectively photo-oriented and developed. A first LCP layer 116 is formed over the first LPP layer 112, oriented to the first LPP layer 112, and developed. The first LPP layer 112 and first LCP layer 116 form a first LPP/LCP layer 118.

Then, a second LCP layer 122 is formed over the first LCP layer 116, oriented to the first LCP layer 116, and developed, forming a multi-LCP-layer structure 118'. In this way, the thickness of the birefringent polymer material is built up.

The invention has been described above in reference to specific embodiments. Alterations, modifications, and improvements may occur to those skilled in the art. Such alterations, modifications, and improvements are intended to be within the spirit and scope of the invention. Accordingly, the foregoing description is by way of example only, and is not intended as limiting. The invention is limited only by the following claims and equivalents thereto.

What is claimed is:

1. An anti-aliasing filter for use in a device including a photodetector array having a plurality of pixels, comprising:
    a substrate;
    a first double-refraction plate ("DRP") adapted to separate an incoming ray of light into an ordinary ray and an extraordinary ray having different polarization states, the DRP having at least
        a first liquid photo-polymerization ("LPP") layer having an optical axis oriented at an angle non-parallel and non-perpendicular to a surface of the LPP layer, the first LPP layer connected to the substrate, and
        a first liquid-crystal polymer ("LCP") layer disposed on the first LPP layer having an optical axis aligned with the orientation of the optical axis of the LPP layer, the orientation comprising an optical axis of the first DRP,
    the first DRP having a thickness and an optical axis selected so as to provide a selected separation, d, of ordinary and extraordinary light rays such that d is large enough for the separated ordinary and extraordinary light rays to substantially illuminate two adjacent pixels of the photodetector array.

2. The anti-aliasing filter of claim 1 wherein the first LPP layer is disposed on the substrate.

3. The anti-aliasing filter of claim 1 further comprising an intervening layer disposed between the substrate and the first LPP layer.

4. The anti-aliasing filter of claim 1 further comprising a second LCP layer disposed on the first LCP layer.

5. The anti-aliasing filter of claim 4 wherein the first LPP layer has a selected orientation and the second LCP layer has the selected orientation.

6. The anti-aliasing filter of claim 1 wherein the thickness is between about 10 microns and about 150 microns.

7. The anti-aliasing filter of claim 1 further comprising:
    a first anti-reflective filter disposed on a first surface of the anti-aliasing filter, and
    a second anti-reflective filter disposed on a second surface of the anti-aliasing filter.

8. The anti-aliasing filter of claim 7 wherein the second anti-reflective filter is disposed on the first DRP.

9. The anti-aliasing filter of claim 7 wherein the second anti-reflective filter is disposed on a second substrate, the second substrate being affixed to the first DRP.

10. The anti-aliasing filter of claim 9 wherein the second substrate is affixed to the first DRP with optical adhesive so as to provide index matching between the first DRP and the second substrate.

11. The anti-aliasing filter of claim 1 further comprising:
    a retarder plate disposed on the first DRP having an optical axis parallel to the surface of the LPP layer; and
    a second DRP disposed on the retarder plate adapted to separate an incoming ray of light into an ordinary ray and an extraordinary ray having different polarization states, the second DRF having at least
- a first liquid photo-polymerization ("LPP") layer having an optical axis oriented at an angle non-parallel and non-perpendicular to a surface of the LPP layer, said first LPP layer connected to the retarder plate, and
- a first liquid-crystal polymer ("LCP") layer disposed on the first LPP layer having an optical axis aligned with the optical axis of the LPP layer, the orientation comprising an optical axis of the second DRP, the second DRP having a thickness and an optical axis selected so as to provide a selected separation, d, of ordinary and extraordinary light rays such that d is large enough for the separated ordinary and extraordinary light rays to substantially illuminate two adjacent pixels of the photodetector array.

12. The anti-aliasing filter of claim 11 wherein the retarder plate and the second DRP are selected so as to provide a two-dimensional anti-aliasing filter for at least one color of light.

13. The anti-aliasing filter of claim 11 wherein the first DRP, the retarder plate and the second DRP are selected so as to provide a one-dimensional anti-aliasing filter for a first color of light and a two-dimensional anti-aliasing filter for a second color of light.

14. The anti-aliasing filter of claim 11 wherein the retarder plate includes a plurality of quarter-wave retarder plates.

15. The ariti-aliasing filter of claim 11 wherein the first DRP, the retarder plate, and the second DRP are all made from an LPP material and an LCP material.

16. The anti-aliasing filter of claim 11 wherein the first DRP is made from a first LPP material and a first LCP material, and the retarder plate is made of a second LPP material and one of the first LCP material and a second LCP material.

17. The anti-aliasing filter of claim 11. wherein the substrate is infrared-blocking color glass.

18. The anti-aliasing filter of claim 17 further comprising an infrared-blocking filter.

19. The anti-aliasing filter of claim 11 further comprising an infrared-blocking filter.

20. The anti-aliasing filter of claim 1 further comprising:
- a package for providing environmental security to an imaging device; and
- a photodetector array disposed within the package, the anti-aliasing filter being disposed on a lid of the package.

* * * * *